May 15, 1951     J. S. HILL     2,552,676
METHOD OF MANUFACTURING ORGANOMETALLIC COMPOUNDS
Filed Nov. 27, 1946
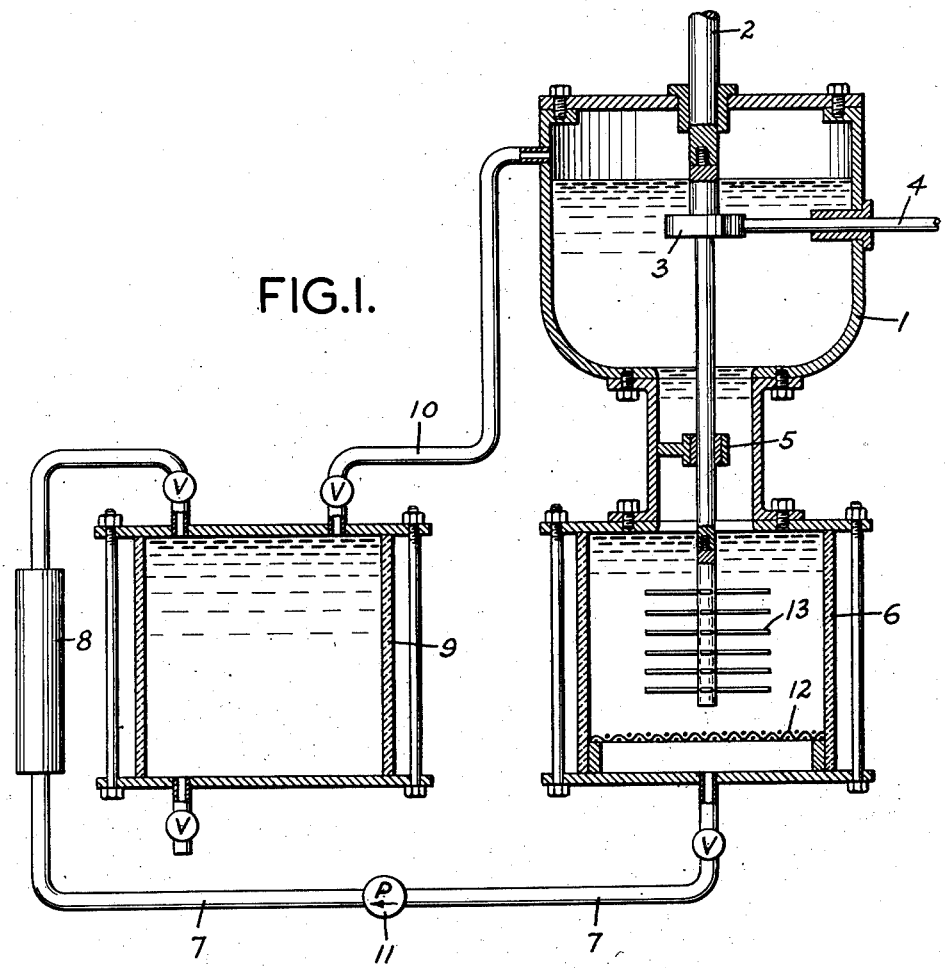
FIG.I.
INVENTOR.
JOHN STANLEY HILL
BY
Blair, Curtis & Hayward
ATTORNEYS.

Patented May 15, 1951

2,552,676

UNITED STATES PATENT OFFICE 2,552,676

METHOD OF MANUFACTURING ORGANO-METALLIC COMPOUNDS

John Stanley Hill, Rossmoyne, Ohio, assignor to The Cincinnati Milling Machine Co., Cincinnati, Ohio, a corporation of Ohio Application November 27, 1946, Serial No. 712,618

5 Claims. (Cl. 260—665)

This invention relates to the manufacture of organo-metallic compounds and to solutions of organo-metallic compounds, and more particularly to an improved manufacturing procedure for preparing Grignard reagents, which makes possible their commercial production, and to a product containing the Grignard reagent, which product is suitable for commercial distribution.

One of the objects of the invention is to provide a novel solvent for manufacturing organo-metallic compounds to reduce hazards that have so long been associated with their preparation. Another object is to provide such a solvent which does not slow the reaction starting time or the reaction rate of the reaction between a metal and an organic compound. Another object is to provide a novel Grignard reagent product which may be stored and shipped in concentrated form with a minimum of danger and a minimum of deterioration of the reagent, and which product is adapted for new uses such, for example, as the drying of gases.

Other objects will be in part obvious and in part pointed out hereinafter.

In the drawing:

Figure 1 shows diagrammatically an apparatus in which the method of the invention may be practised and in which the product of the invention may be conveniently manufactured.

The term "Grignard reagent" as herein used in the specification and claims is intended to include the usual organo-magnesium halide compounds and to include solutions in solvents containing ether linkages of compounds of the general formula RMgX, where R is an alkyl group and X is a halogen radical. It is understood that compounds, RMgX, normally consist of an equilibrium system with $R_2Mg$, as has often been described in the literature as represented by

$$2RMgX \rightarrow R_2Mg + MgX_2$$

As is well known, organo-magnesium halides and analogous organo-metallic compounds are used as Grignard reagents in the synthesis of organic and of organo-metallic compounds. In spite of the great importance of this reaction for synthesis in organic chemistry (it was discovered in France by Grignard in 1871) its commercial use has been held back by a hazard (the use of diethyl ether), which until now has been the solvent generally used in the preparation of all organo-metallic compounds. This is particularly true of the preparation of the Grignard reagents in which the organic halide has almost invariably been dissolved in diethyl ether to cause it to react with magnesium metal. The explosion and fire hazard of diethyl ether and the distillation problems involved in its recovery and purification are well known and so real that even laboratory chemists have long hesitated to prepare true Grignard reagents.

Of the various organic halides that may be used in the preparation of Grignard reagents, the chlorides are usually the cheapest and most readily available, and hence there are many cases in which the commercial use of a Grignard reagent for a particular application is contingent upon the possibility of using an organic chloride in its preparation. Because the organic chlorides are less active than the other organic halides (except the fluorides) and are more difficult to react with the magnesium metal, chemists heretofore have, in general, succeeded in reacting the organic chloride with magnesium, to a commercially practicable extent, only in the presence of diethyl ether. Higher boiling mono ethers have been tried as substitute solvents for the low boiling diethyl ether, but the result has been longer time for the reaction to start, slower reaction rates once the reaction does start, and in many instances lower percentage yields of the Grignard reagent. Thus, although such a mono ether as di-n-butyl ether which boils at a higher temperature than diethyl ether has long been commercially available in tonnage quantities, and although it is possible to carry out certain Grignard reactions in this ether, nevertheless the disadvantages above mentioned have excluded di-n-butyl ether from the field of Grignard reagent preparation.

It has now been discovered that glycol ethers of the general type

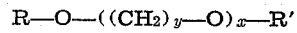

$$R-O-((CH_2)_y-O)_x-R'$$

where:
R is an organic alkyl radical,
R' is an organic alkyl radical,
$x$ is an integer having a value of one or greater, and
$y$ is an integer having a value of two or greater may be successfully used as solvents for organo-metallic reactions. Such a solvent used in place of diethyl ether, gives Grignard reagent percentage yields as high or higher than when the diethyl ether is used, and with a comparable degree of ease in starting the reaction and with a comparable reaction rate. In fact, in the preparation of at least one Grignard reagent (phenyl magnesium chloride) the starting time is noticeably reduced and the rate of reaction is speeded up when such solvents are used in place of diethyl ether.

Inasmuch as the boiling points of the various ethers of this general type cover a relatively wide temperature range, a solvent from this group may be picked with a boiling point most widely differing from that of the synthesis product finally to be made by the reaction of the Grignard reagent with some other compound. Such selection aids in the separation by distillation of the product from the solvent and simplifies the separation problem. Another advantage obtained by using a solvent selected from the foregoing general formula is that because the solvents included in the formula cover a wide range of solubility in water (from completely miscible to only slightly soluble), the solvent may be selected which has the solubility which favors the ultimate separation of the products by solubility difference. Thus, the discovery has provided industry with a wide choice of solvents for the Grignard reaction, from which the one best suited to the particular reaction being carried out may be selected.

As is well known, the formation of the Grignard reagent may be expressed by the equation $$RX+M \rightarrow RMX$$

or $$RX+M \rightarrow RM+X$$

where:
R is any organic radical
X is a halide or sulphate radical, and
M is magnesium or other metal capable of forming a Grignard type reagent.

The reaction is caused to take place by bringing the organic halide into contact with the metal magnesium. But the reaction is frequently difficult to start, and when once started frequently either continues at an explosive rate with the emission of heat, or continues at a very slow rate. As above mentioned, the reaction has customarily been carried out in the presence of diethyl ether, which evidently plays a part in facilitating the reaction, and in so doing (as suggested by many textbooks) actually forms a complex compound either with the organic halide or with the organo-magnesium halide. When higher boiling mono ethers were used as solvents to avoid the disadvantages accompanying the use of diethyl ether, and the starting and the reaction times prolonged, the percentage yields of the Grignard reagent were in general lower due possibly to side reactions between the magnesium and the organic halide, or by the reaction of the Grignard reagent with the solvent. But the actual mechanics of the reaction by which the Grignard reagent is formed either in diethyl ether or in the higher boiling mono ethers has remained unknown during the seventy-five years that the Grignard reaction has been used. There have been several theories advanced as to the mechanics of the reaction, but they are in conflict and there has been none that has been universally accepted.

With regard to the present discovery that an ether of the above general formula may be used as the solvent for practically all Grignard reactions, there is no satisfactory explanation that explains why, when it is used, a commercially practical reaction starting time is obtained, a commercially practical reaction rate is obtained, and high percentage yields are obtained; or why it is so stable (unreactive) even with most of the more reactive of the Grignard reagents. But the fact is that such ethers are useful for the above reasons for carrying out those Grignard reactions which are normally difficult to carry out because of the difficulty of starting the reaction, or because of the activity of the Grignard reagent and its tendency to react with the solvent. And such ethers are equally successful and useful in the preparation of those Grignard reagents which are less difficult to prepare.

Furthermore, solvents of the above-identified general formula are readily purified on a commercial scale, are readily distilled without the comparable danger involved in distilling diethyl ether, are in general good solvents, and do not react appreciably with Grignard reagents. Also, the Grignard reagent in such solvents may be highly concentrated.

Inasmuch as a solution, concentrated or dilute, of a Grignard reagent in such solvent is stable and does not deteriorate appreciably, and because of the relatively high boiling point of such solvents as compared with that of diethyl ether, the solution may conveniently be shipped to Grignard reagent users without appreciable explosion hazards.

The Grignard reagent user may use the Grignard reagent in a solvent of the above general formula to react with the compound to be added to the organic radical of the Grignard reagent, thereby avoiding disadvantages of having to distill off and handle the dangerous diethyl ether; or the user may use other solvents such as toluene, xylene, etc., to dilute the reactants.

The user may use the Grignard reagent in such solvents as defined by the general formula to dry gases by bubbling such gases through the solution of the Grignard reagent, and because of the high boiling point of the solvent, the gases are not objectionably contaminated by the solvent.

The following examples are typical of how a Grignard reagent may be prepared using the present discovery. The first example is the preparation of phenyl Grignard in diethyl ether of ethylene glycol (diethyl Cellosolve, $$C_2H_5OC_2H_4OC_2H_5$$

boiling point 121.4° C.) one of the ethers of the general type expressed by the formula. This solvent has been available in commercial quantities for a number of years, and is the least costly of those of the general formula presently commercially manufactured.

Phenyl Grignard, prepared by reacting phenyl chloride with magnesium, is one of the most difficult to prepare of the Grignard reagents in common laboratory use—even when diethyl ether is used as the solvent. Yet, when diethyl Cellosolve is used as a solvent, the reaction starts readily and proceeds fairly rapidly at refluxing temperature. Thus a 500 cc. flask was charged with 100 cc. of diethyl Cellosolve (suitably dried and purified but without any catalyst); 11.2 gms. of phenyl chloride; and 3 gms. of freshly cut magnesium chips (an excess for the amount of phenyl chloride). The contents were refluxed for three hours at atmospheric pressure, at which time the reaction forming the Grignard reagent started. The reaction went to completion in three additional hours, and gave a satisfactory yield.

Ethyl Grignard was prepared in diethyl Cellosolve as a solvent. The procedure followed was to charge a 250 cc. glass-stoppered flask with 90 cc. of diethyl Cellosolve (suitably dried and purified); 10 cc. of ethyl chloride; and an excess of freshly cut magnesium chips. This mixture was allowed to stand overnight without heating. The following morning 14 cc. of ethyl chloride were added and the reaction which had started during the night continued at a satisfactory rate. Later 10 cc. of ethyl chloride were added. The reaction went to completion and gave a yield of ethyl Grignard comparable to that obtained with diethyl ether as the solvent. The fact that the reaction was started and completed without the application of heat, conclusively shows that the diethyl Cellosolve solvent is satisfactory for this reaction, and that it would have proceeded rapidly had heat been applied.

Methyl Grignard was prepared in diethyl Cellosolve as follows: A liter flask was charged with 25 gms. of freshly cut magnesium chips; and with 300 cc. of solvent suitably purified and .35 normal with respect to methyl magnesium chloride. The Grignard reagent present in the solvent insures its being dry and also catalyzes the reaction. A glass tube was run through the stopper to the bottom of the flask and methyl chloride gas was bubbled into the solution. The excess methyl chloride gas was not recovered. The reaction started immediately at atmospheric and room temperature and continued until the solution became almost solid. Sludge formed as is customary with this reaction when carried out in diethyl ether, and benzene was added to dissolve and liquefy the mixture. The yield obtained was high and compared favorably to the yields obtained when diethyl ether is used as a solvent.

Phenyl Grignard was prepared in diethyl Cellosolve as follows: A 500 cc. flask was charged with 160 cc. of highly purified diethyl Cellosolve; with 9 gms. of freshly cut magnesium; and, with 40 cc. of phenyl bromide. This solution was refluxed at atmospheric pressure and after fifteen minutes of refluxing the reaction started. One hour after the refluxing was started, 40 additional cc. of phenyl bromide and 9 additional grams of magnesium were added. The reaction went to completion and gave a yield of phenyl Grignard comparable to that obtained with diethyl ether; showing that this solvent is comparable to diethyl ether in its resistance to attack by Grignard reagents.

In the above examples the diethyl Cellosolve used was suitably purified by steam distillation followed by a second distillation in which the water was stripped off and the final product was treated with sufficient Grignard reagent to remove traces of Grignard reactive impurities including moisture.

Following the same general procedure described in the preparation of phenyl Grignard (bromide) using diethyl Cellosolve as a solvent, phenyl Grignard (bromide) was made with other solvents of the above general formula. Thus, it was prepared by reacting magnesium with phenyl bromide in each of the following solvents:

1. Dimethyl ether of ethylene glycol
    ($CH_3-O-C_2H_4-O-CH_3$); (boiling point 85° C. at 752 mm.)
2. n-Butyl ethyl ether of ethylene glycol
    ($C_4H_9OC_2H_4OC_2H_5$); (boiling point 165° C. at 746 mm.)
3. n-Butyl ethyl ether of diethylene glycol
    ($C_4H_9O(C_2H_4O)_2C_2H_5$); (boiling point 178° C. at 207 mm.)
4. Diethyl ether of diethylene glycol
    ($C_2H_5O(C_2H_4O)_2C_2H_5$); (boiling point 188.9° C.)
5. Di-n-butyl ether of ethylene glycol
    ($C_4H_9OC_2H_4OC_4H_9$); (boiling point 203.3° C.)
6. Dimethyl ether of tetraethylene glycol
    ($CH_3O(C_2H_4O)_4CH_3$); (boiling point 275.8° C.)

In each instance a yield of phenyl Grignard was obtained comparable to that obtained with diethyl ether. Because the formation of phenyl Grignard (bromide) in good yield is difficult because of the highly reactive bromide radical which has a strong tendency to react with the solvent, these examples show that these solvents are in general as unreactive with the Grignard reagents as is diethyl ether.

It has also been discovered that the satisfactory yields of the Grignard reagent prepared in solutions of the above general formula are still further improved when the Grignard reagent, in such solvents, is prepared by the mechanical activation process, and apparatus, disclosed in the United States patent application of Milton C. Shaw, filed April 3, 1942, Serial No. 437,607, now Patent No. 2,416,717 issued March 4, 1947. In the mechanical activation process, the chemical reaction between the magnesium and the organic halide is carried out by cutting the magnesium chips in the presence of the organic halide, and solvent.

Referring to Figure 1, which diagrammatically shows the setup of the apparatus by which mechanical activation was used to prepare Grignard reagents in diethyl Cellosolve, the apparatus comprises a closed tank 1 through the top of which extends a shaft 2 carrying a cutting element 3. A magnesium rod 4 is suitably fed through the side of the chamber 1 to the cutter 3. An outlet 5 at the bottom of the chamber 1 enters the top of a chamber 6 which is conveniently made by closing the ends of a glass cylinder. The shaft 2 extends through the outlet 5 into chamber 6 and carries stirrers 13. From the bottom of chamber 6 a pipe 7 conducts the liquid contents to a heat exchanger 8, and thence to the top of a second chamber 9 similar to chamber 6. From the top of chamber 9 a pipe 10 extends to the side of chamber 1. A pump 11 in the pipe 7 circulates liquid from chamber 6 through the heat exchanger, through chamber 9, and back into chamber 1. A screen 12 in chamber 6 collects chips and other solid material and prevents them from being circulated through the pump 11.

In practice, when the organic halide is a liquid the chamber 1, the chambers 6 and 9 and the connecting pipes, are charged with the solvent and organic halide solution in such manner that when the chambers 6 and 9 and pipe 7 are filled, the liquid level in the tank 1 is above the cutting element 3. When the organic halide is a gas liquid level may be maintained below the cutter. In operation the cutting element is rotated by a suitable drive, and the magnesium rod 4 is fed to the cutter by a suitable feeding mechanism, the magnesium chips cut off pass through the liquid in chamber 1, down through the outlet 5, into chamber 6. The liquid in chamber 6 is recirculated through heat exchanger 8 to the degree required either to cool or to heat the liquid. Chamber 1 is provided with a heat exchange jacket so that its contents may be either heated or cooled. The entire system is sealed against atmosphere and so may be run under vacuum or under considerable pressure—suitable seals being provided for the shaft 2 and the magnesium rod 4 as explained in the Shaw application.

Using the above method and apparatus to prepare phenyl magnesium chloride in diethyl Cellosolve, the apparatus was charged with 7.2 lbs. of purified diethyl Cellosolve .1 normal with phenyl magnesium chloride; and with 7.8 lbs. of phenyl chloride. The chamber 1 was intermittently heated with steam and the heat exchanger was intermittently used to cool the liquid to maintain the temperature of the liquid in chamber 1 at a temperature varying between 100° and 120° C., to keep the pressure within the system between 0–30 lbs. The cutter 3 was rotated to provide a cutting speed of 800 ft./min., and the ¾ in. diameter magnesium rod was fed at a rate of 3.07 in./min. Under these conditions, a total of 28 gm. moles of magnesium was cut, the cutting operation being operated intermittently to keep magnesium chips always present in sufficient amount to keep the reaction active in the chamber 6, but not to allow such an excessive amount of chips building up as would interfere with the circulation of the solution through the chamber 6 or cause the reaction to proceed too rapidly.

With the above procedure, the reaction was completed in approximately seven hours, and gave a satisfactory percentage yield of the phenyl Grignard as high as that obtained when the phenyl Grignard was prepared in a flask.

Also in this apparatus a satisfactory percentage yield of ethyl magnesium Grignard was obtained as good as that obtained when the Grignard reagent was prepared in a flask. In carrying out the preparation of ethyl magnesium chloride the same apparatus was charged with 6.5 liters (12 lbs.) of purified diethyl Cellosolve which was 1.37 normal, with respect to ethyl magnesium chloride. 4.75 lbs. of ethyl chloride was added in two batches (equal quantities); one batch before the cutting was started, and the second batch about thirty minutes after the cutting was started. The cutter was run at a cutting speed of 393 ft./min. and the magnesium rod was fed at a rate of 3.07 in./min. The cutting was carried on intermittently for the reasons above described, and 33.4 gm. moles of magnesium were cut. The temperature was controlled between 30° and 61° C., as described in connection with the preparation of the phenyl Grignard, so that the pressure was maintained within the range of 0–21 lbs./sq. in. gage. The reaction was completed in one hour and eighteen minutes, and gave a yield comparable to that obtained when the ethyl magnesium chloride was prepared in diethyl Cellosolve in the flask.

Using the same apparatus, methyl Grignard (chloride) was made. The apparatus was charged with 7.2 liters of diethyl Cellosolve .72 normal with respect to methyl magnesium chloride. 16.1 gm. moles of magnesium was cut intermittently in the same manner as in the example of the preparation of ethyl Grignard. 3 lbs. of methyl chloride (as a gas) was intermittently bubbled into the solution. The cutting operation and the methyl chloride feed were controlled to keep the reaction under control, and to keep a suitable amount of magnesium chips in the chamber 6, and to keep the temperature from rising above 77° C. To this end, the heat exchanger 8 was also used to cool the solution. The reaction was continued for one hour and thirty minutes after the cutting started. As in the preparation of methyl Grignard in the flask, a sludge was formed but the percentage yield of the Grignard reagent was higher than that in the flask.

In the formation of methyl Grignard from methyl chloride, and to a lesser extent from methyl bromide, difficulty is encountered because of the formation of large quantities of precipitate which plug transfer lines, make stirring difficult, and limit the rate of reaction and the final concentration of the Grignard reagent. The nuisance of this precipitation is recognized by research workers and commercial manufacturers of methyl Grignard. Although considerable attention has been directed to the problem of finding a high boiling solvent in which the methyl Grignard can be prepared commercially in reasonably high concentrations, and without troublesome formation of precipitate, no practical solvent has heretofore been discovered.

It has now been found that concentrations of methyl Grignard (presumably of the form methyl magnesium chloride) up to 4.2 normal may be prepared in diethyl ether of diethylene glycol and in dimethyl ether of tetra-ethylene glycol without precipitation. The concentration obtainable may be increased by increasing the temperature. For example, while the methyl Grignard at 4.25 normal in diethyl ether of diethylene glycol is completely dissolved at 85° C., the solution solidifies at room temperature. The methyl Grignard at 4 normal in dimethyl ether of tetraethylene glycol is soluble at room temperature, above 25° C. The consistency of this solution at room temperature is about like that of a heavy corn syrup. But when it is warmed up it becomes fluid and may be transferred through pipes without difficulty. Both of these solvents have boiling points appreciably above diethyl ether. Also both solvents are completely miscible with water so that by adding water to the final reaction solution after the Grignard reagent has been reacted to form the final product, the product may be separated out and the solvent recovered by distillation.

As many possible embodiments might be made of the present invention and as many changes might be made in the embodiments described above, it is to be understood that the foregoing description is to be interpreted as illustrative only and not in a limiting sense.

I claim:

1. In a process for manufacturing organo-metallic compounds, the improvement which comprises reacting an organic chloride with magnesium in a di-alkyl ether of an ethylene glycol as a solvent, said glycol having from 1 to 4 ethylene groups and the alkyl groups of said ether having from 1 to 4 carbon atoms.

2. In a process for manufacturing organo-metallic compounds, the improvement which comprises reacting an organic chloride with magnesium in a di-alkyl ether of ethylene glycol as a solvent, the alkyl groups of said ether having from 1 to 4 carbon atoms.

3. In a process for manufacturing organo-metallic compounds, the improvement which comprises reacting an organic chloride with magnesium in a di-methyl ether of ethylene glycol as a solvent.

4. In a process for manufacturing organo-metallic compounds, the improvement which comprises reacting an organic chloride with magnesium in a di-ethyl ether of ethylene glycol as a solvent.

5. In a process for manufacturing organo-metallic compounds, the improvement which comprises reacting an organic chloride with magnesium in a di-n-butyl ether of ethylene glycol as a solvent.

JOHN STANLEY HILL.

REFERENCES CITED

The following references are of record in the file of this patent:

UNITED STATES PATENTS

| Number | Name | Date |
|---|---|---|
| 2,066,198 | Buc | Dec. 29, 1936 |
| 2,125,401 | Scott | Aug. 2, 1938 |

OTHER REFERENCES

Gilman et al.: Rec. Trav. Chem. des Pays-bas, vol. 46, 463–472 (1927).

Marvel et al.: Jour. Am. Chem. Soc., vol. 50, 2810–2 (1928).

Hackh: Chemical Dictionary, 3d edition, published by Blakiston Co., Philadelphia (1944), page 389.

Bourgom: Chem. Abs., vol. 18, 1814–15 (1924).